United States Patent
O'Neil et al.

(10) Patent No.: US 6,549,838 B2
(45) Date of Patent: Apr. 15, 2003

(54) HIGH ENERGY ENGAGEMENT STRATEGY FOR AUTOMATIC TRANSMISSION CLUTCHES AND BRAKES

(75) Inventors: Brian Michael O'Neil, Ann Arbor, MI (US); John Paul Gorys, Canton, MI (US); John Mathew Pogorzelski, Brownstown Township, MI (US); Jacob Martin Povirk, Novi, MI (US); Joseph Scott Slayton, Sterling Heights, MI (US); Steven DeWayne Dunn, Whitmore Lake, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/681,685

(22) Filed: May 21, 2001

(65) Prior Publication Data

US 2002/0173894 A1 Nov. 21, 2002

(51) Int. Cl.[7] .................. G06F 17/00; G06F 7/00
(52) U.S. Cl. .................. 701/51; 701/67; 477/37; 477/77; 477/92; 477/107; 477/115; 123/41.05; 123/41.13; 193/31
(58) Field of Search .................. 701/51, 61, 62, 701/60, 67; 477/97, 906, 70, 171, 115, 120, 37, 38, 40, 39, 45, 46, 50, 77, 79, 80, 92, 107, 110, 122, 126; 123/41.05, 41.12, 41.13; 192/31, 32

(56) References Cited

U.S. PATENT DOCUMENTS

| 5,039,305 | A | | 8/1991 | Pierce |
| 5,157,608 | A | | 10/1992 | Sankpal et al. |
| 5,518,468 | A | * | 5/1996 | Sametz et al. ............. 477/156 |
| 5,809,442 | A | | 9/1998 | Schulz et al. |
| 6,122,583 | A | | 9/2000 | Kirchhoffer et al. |
| 6,139,468 | A | * | 10/2000 | Goates et al. ............. 477/97 |
| 6,178,371 | B1 | | 1/2001 | Light et al. |
| 6,178,944 | B1 | | 1/2001 | Kerns et al. |
| 6,253,140 | B1 | * | 6/2001 | Jain et al. ............. 701/67 |
| 6,278,926 | B1 | * | 8/2001 | Jain et al. ............. 701/58 |
| 6,385,520 | B1 | * | 5/2002 | Jain et al. ............. 701/51 |

* cited by examiner

Primary Examiner—Thomas G. Black
Assistant Examiner—Tuan C To
(74) Attorney, Agent, or Firm—F. G. McKenzie

(57) ABSTRACT

A control strategy and method for controlling friction element engagement and disengagement time for an automatic transmission when the transmission is operating at cold ambient temperatures. During drive-to-reverse or reverse-to-drive friction element engagements with power on, the strategy compensates for a tendency of an oncoming friction element to gain capacity before an off-going clutch loses capacity, thereby avoiding a potential friction element tie-up condition when the transmission is operated with intermediate or high levels of engine torque as the friction elements are sequentially engaged and disengaged during cold rock cycling.

12 Claims, 4 Drawing Sheets

HIGH ENERGY ENGAGEMENT STRATEGY FOR AUTOMATIC TRANSMISSION CLUTCHES AND BRAKES

BACKGROUND OF INVENTION

The invention relates to a control strategy and method for truncating engine torque in a vehicle powertrain.

In contemporary automotive vehicle powertrains, it is usual practice to include a transmission with a gear system controlled by fluid pressure-operated clutches and brakes. The clutches and brakes, which are referred to herein as friction elements, are selectively engageable to establish multiple ratios as torque is delivered from a throttle-controlled internal combustion engine and through the transmission to vehicle traction wheels. The transmission clutches and brakes, which establish a reverse torque flow path through the gear system, are different than the clutches and brakes used to establish a forward-drive torque flow path.

The forward-drive clutches and brakes use a fluid pressure delivery path that includes calibrated orifices that are distinct from corresponding calibrated orifices in the pressure delivery path for clutches and brakes used to establish reverse drive. At cold ambient temperatures, when transmission fluid temperatures cause increased viscosity of the automatic transmission fluid, the clutch and brake disengagement time for one clutch, for example, may be longer than the clutch or brake engagement time for another clutch as the operator of the vehicle repetitively shifts the transmission between the forward-drive mode and the reverse-drive mode.

This maneuver commonly is referred to as cold rock cycling. It is used to extricate a vehicle from a low friction road surface, i.e., a snow, ice or mud-covered roadway. It is possible under such conditions for the applying friction element to gain torque capacity before a companion releasing friction element is disengaged or loses torque capacity. This may create a clutch tie-up event. If a clutch tie-up occurs when engine torque is at high or moderate levels, friction element wear or heat distress may occur.

Examples of multiple-ratio automotive transmissions having pressure-operated clutches and brakes in contemporary vehicle powertrains may be seen by referring to U.S. Pat. Nos. 6,122,583, 5,413,539, 5,039,305, 5,809,442, and 5,157,608, which are assigned to the assignee of the present invention. These patents are incorporated in the present disclosure by reference. Each of these patents discloses a transmission for an automotive vehicle powertrain wherein the fluid flow circuit for controlling a friction element for reverse drive is distinct from the fluid flow circuit for controlling a friction element for forward drive. Further, each of them discloses a transmission in which a manual valve, under the control of a vehicle operator, selects a forward-drive range or a reverse-drive range. The engagement-and-release pattern for the clutches and brakes of such transmissions is calibrated for optimum engagement and release time when the transmission fluid is at a controlled temperature.

SUMMARY OF INVENTION

The present invention reduces the possibility of friction element tie-up as the multiple-ratio automatic transmission is cycled between a forward-drive mode and a reverse-drive mode. When a ratio change is characterized by a high kinetic energy engagement, the invention is capable of reducing the possibility of heat distress in the clutch or brake friction material due to simultaneous high energy engagement of the clutches or brakes for one operating mode in one direction and the clutches and brakes that establish a torque delivery mode in the opposite direction. Indeed, the invention will protect the friction elements during any high energy engagement on a non-forward (R,P,N) to forward shift or a non-reverse (OD,P,N,D,2,1) to reverse shift.

The strategy of the present invention will establish a truncated or reduced engine torque at a specified level if the driving conditions are such that the strategy should be triggered due to operation of the clutches and brakes in a cold rock cycling mode. The strategy will be activated, for example, during repetitive high energy forward drive to reverse or reverse drive to forward engagements by reducing the engine torque if there is a possibility of a friction element tie-up condition.

Implementation of the strategy requires predetermined entry conditions before engine torque is reduced to a specified level. The entry conditions include those based upon engine rpm, throttle position, transmission fluid temperature, vehicle speed and the presence of power-on forward-to-reverse or reverse-to-forward engagements. The entry conditions are designed so that inadvertent flagging of the strategy will not occur when truncation of engine torque is not required. The magnitude of engine combustion torque reduction is a function of engine stability, engine temperature and the presence of a driver request, for example, a request for cold rock cycling. The duration of the engine torque reduction achieved by the strategy of the present invention is a function of automatic transmission fluid temperature.

A calibration function of torque versus engine speed is used to ensure that the requested torque is at a level sufficient to prevent engine stalling, misfires or engine instability.

A powertrain capable of using the strategy and method of the invention would include pressure-operated clutch and brake elements, engine coolant and transmission fluid temperature sensors, a traction wheel speed sensor, an engine throttle position sensor, and a driver-operated transmission range selector. The strategy includes the steps of determining the duration of a torque truncation when strategy energy conditions are met, verifying whether entry conditions are met, including verifying whether the transmission fluid temperature is below a threshold value, determining the magnitude of a torque truncation, and setting a maximum truncation value dependent on friction element capacity.

DETAILED DESCRIPTION

Figure 1:
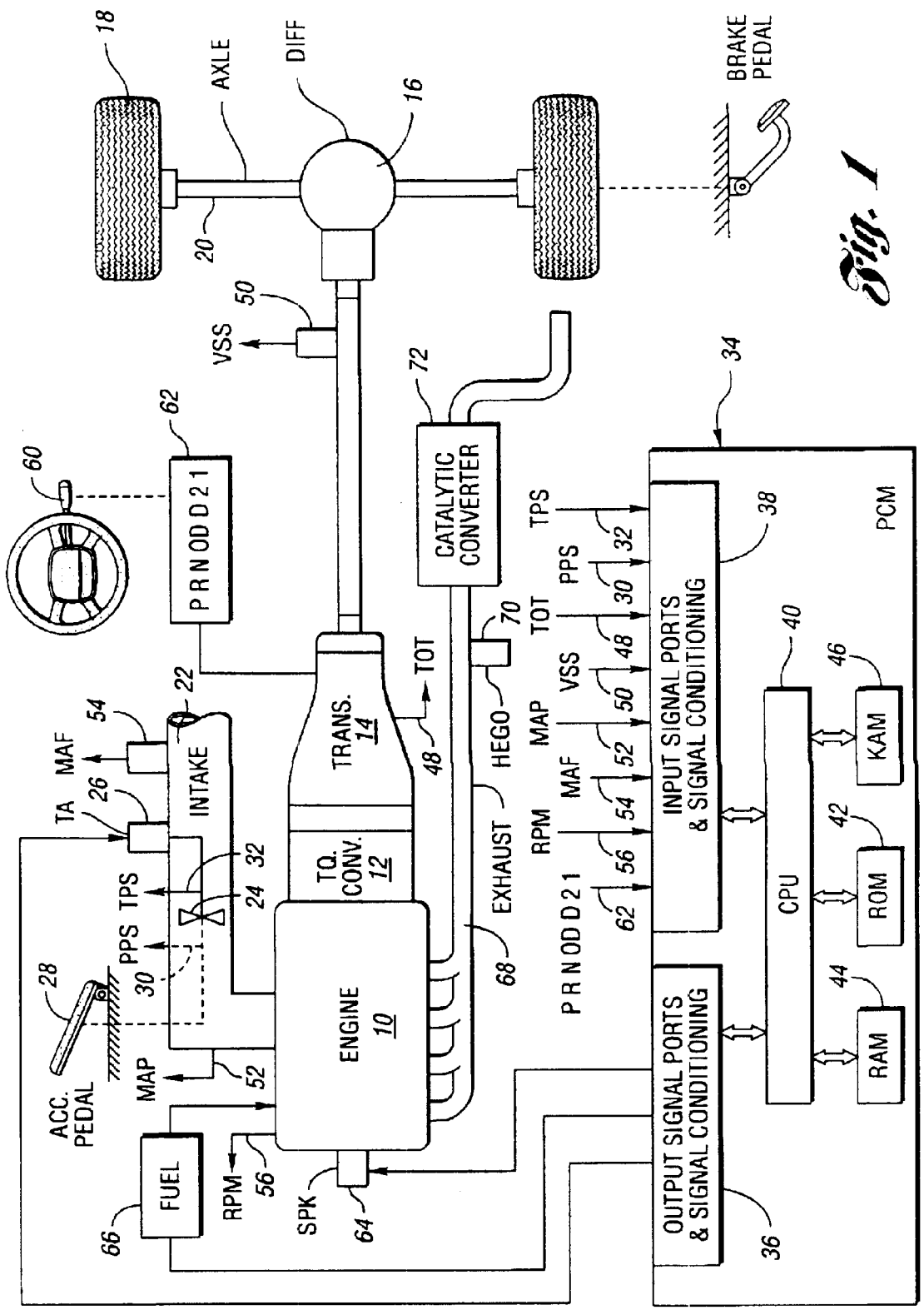
FIG. 1 is a schematic representation of a vehicle powertrain for a contemporary automotive vehicle including a microprocessor for controlling the vehicle transmission and engine.

In FIG. 1, an automotive vehicle engine is schematically shown at 10. It develops an engine torque that is distributed to a hydrokinetic torque converter 12. The torque converter has an impeller, not shown, connected to the crankshaft of the engine and a turbine, not shown, connected to torque input gearing of a transmission 14. The torque output elements of the gearing distribute driving torque to a geared differential 16 through a drive shaft. The torque output elements of the differential distribute torque to the traction wheels 18 through axle shafts 20.

The engine has an intake manifold system schematically shown at 22, which admits air to the engine intake valve ports, the flow through the intake manifold being controlled by a throttle valve 24 and actuator 26. The driver demand for engine torque is developed by an accelerator pedal 28. A pedal position sensor at 30 provides an indication of the pedal position as the throttle actuator establishes a throttle position that is sensed by throttle position sensor at 32.

A powertrain control module (microprocessor), generally shown at 34, is used to control both the engine and the transmission. It may be a conventional digital processor characterized by repetitive control loops. It includes output signal ports and signal conditioning circuits 36 and input signal ports and signal conditioning circuits 38. The data received by the input signal port is acted upon by a central processor unit 40. Control algorithms used by the CPU 40 are stored in main read-only memory portion 42. The data received from sensors in the powertrain are stored by random access memory 44. A keep-alive memory 46 retains computed functions using data supplied by the various sensors when the powertrain is deactivated.

The signal received by the throttle position sensor is distributed to the input signal ports 38. A pedal position sensor, a transmission operating temperature sensor, a vehicle speed sensor on the driveshaft, a manifold pressure sensor, a mass air flow sensor and an engine speed sensor are shown, respectively, at 48, 50, 52, 54 and 56.

The driver-controlled range selector mechanism for the transmission 14 is schematically shown at 60. It typically is located on the vehicle steering wheel column, but it may be located also in the vehicle control console within the vehicle passenger compartment. The range selector activates a range sensor 62, which distributes a signal to the input signal ports 38.

The powertrain control module can control engine torque by modifying the engine spark advance or by controlling the fuel injection rate. A spark retard signal can be distributed from the output signal ports 36 to a spark retard control 64 to effect torque truncation. A fuel control 66 may receive an engine torque truncation signal from the output signal ports 36.

The engine 10 has an exhaust manifold system shown generally at 68. The heated exhaust gas oxygen sensor 70 typically would be included in the exhaust system, as well as a catalytic converter 72 for oxidizing undesirable exhaust gas emissions.

The implementation of the strategy for high energy engagements will be described separately with respect to FIGS. 3a, 3b and 4. These figures respectively summarize an event recognition during which it is determined how long engine torque truncation should occur, enablement of the strategy for truncating torque during which the entry conditions for determining whether to truncate engine torque are checked, and a determination of how much torque truncation should be established, assuming the entry conditions are met.

Event Recognition

The transmission manual range selector lever 60 is checked to determine if there has been a requested change from the previous value. The positions that are available for selection by the vehicle operator are "park"(P), "reverse" (R), "neutral"(N), "overdrive"(OD), "drive"(D), "D2"(2) and "D1"(1). The overdrive, drive, D2 and D1 range selector positions are all forward-drive (FWD) selections. The reverse (R) selection is the only reverse position that can be selected. The neutral position (N) separates the reverse position from the four forward-drive positions. Thus, during rock cycling, the operator must move the selector lever through neutral from the reverse position to a forward position or from a forward position to the reverse position.

Figure 3A:
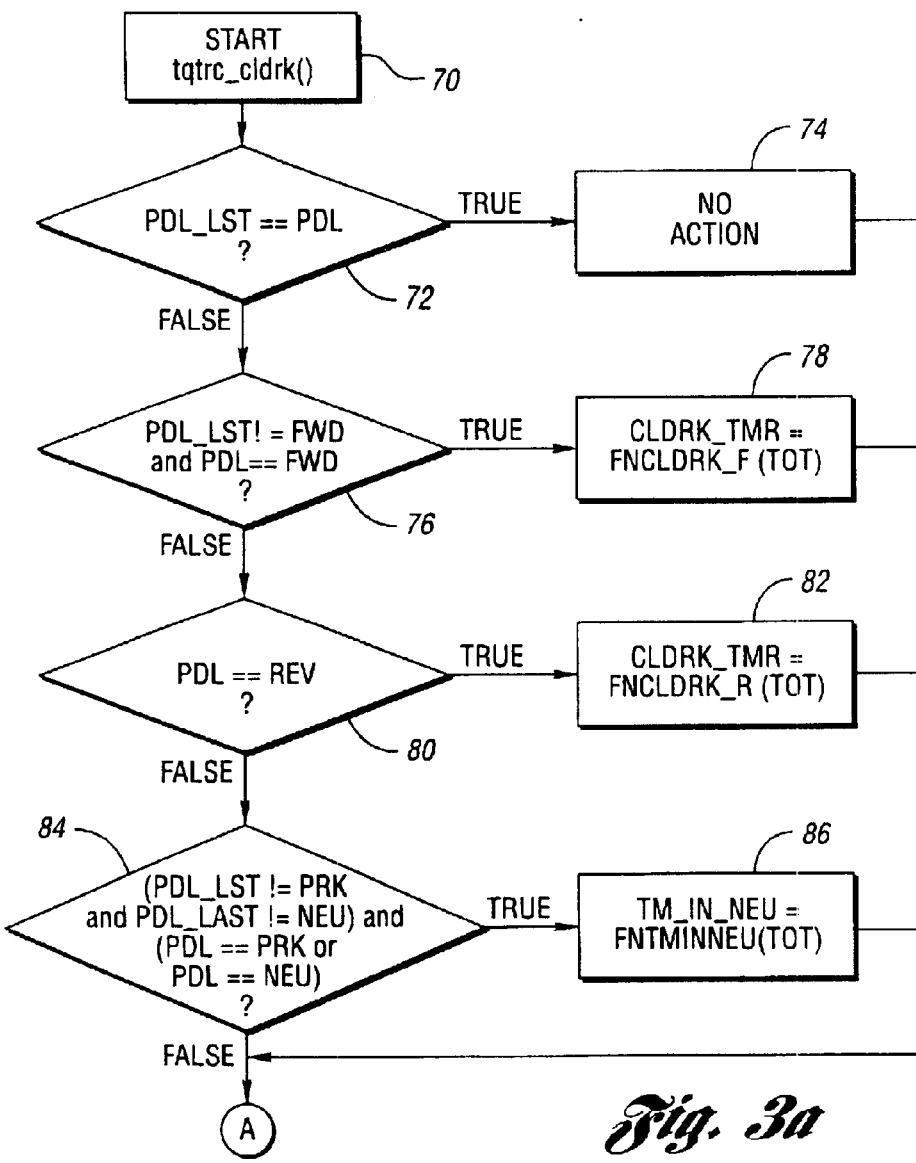
FIG. 3a is a flowchart that summarizes the portion of the strategy that determines how long engine torque should be truncated if the entry conditions for the strategy are satisfied.

If cold rock cycling strategy is started, as shown at 70 in FIG. 3a, the check is made at step 72 to determine whether there has been a requested change from the previous driver selection. If the last manual lever position is equal to the present lever position, as indicated at 72, no action will be taken, as shown at 74. The strategy then is not enabled. If the manual lever position during the last background loop check by the processor 34 is not equal to the present manual level position, the strategy routine will proceed to step 76, where it is determined by the algorithm what type of engagement is being requested by the operator. For a non-forward-to-forward engagement, where the previous manual lever position is not equal to a forward position and the present manual lever position is in the forward position, a timer 78 is loaded with a value that is calibrated to anticipate the amount of time it will take for an oncoming clutch to engage and/or an off-going clutch to release. This time is a function of transmission operating temperature (TOT). If the transmission operating temperature is low, a greater amount of time is required.

The relationship between time and temperature is an empirical function developed during calibration. The timer will denote the maximum amount of time that the transmission will request the torque clip or torque truncation from the engine controller, which delivers instructions to engine spark retard control 64 and to engine fuel control 66 seen in FIG. 1. For an engagement into reverse gear, the same timer will be loaded with a similar calibration function for reverse engagement time.

The timer is immediately loaded with a new value regardless of its current value. This ensures that the timer is loaded with a value that is based on the latest requested event.

If the inquiry at step 76 is false, the routine proceeds to step 80, where it is determined whether the manual lever is in the reverse position. If it is in the reverse position, the timer, as previously mentioned, is set as shown at 82.

For disengagements to park or neutral from a non-park and a non-neutral state, as shown at step 84, a separate timer is loaded, as shown at 86, with a transmission operating temperature dependent function. This denotes how long the disengagement event is anticipated to take.

Event Enablement Check

Figure 3B:
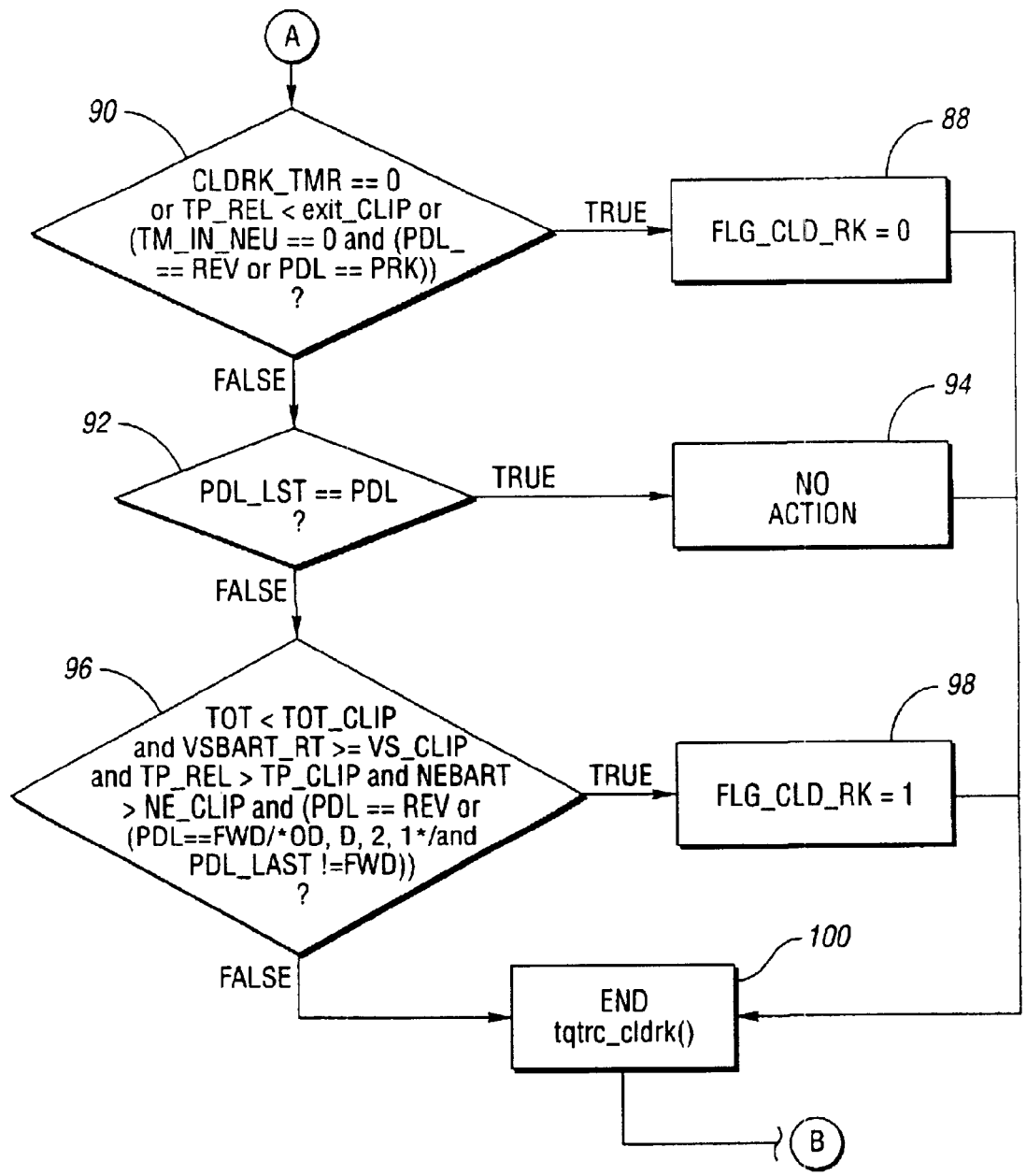
FIG. 3b is a flowchart that summarizes the portion of the strategy of the present invention that determines whether engine torque should be truncated.

FIG. 3b shows the portion of the control strategy that involves an enabling and disabling check. It is determined during this portion of the strategy whether the engine torque should be truncated for a high energy engagement event. This is done by either setting or clearing a flag, shown at 88, for cold rock cycling. At step 90, the strategy will check disable criteria if the cold rock cycle timer described with reference to control block 86 is zero (the cold rock cycling is not flagged). Further, if the throttle position, which is an indication of engine torque, is less than the calibrated minimum value, or if both the time in neutral clock setting (TM_IN_NEU) is zero and the PRNDL position is in park or neutral, the flag at 88 is cleared or disabled.

If the above criteria are not met, the algorithm will proceed to check for a requested change in the position of the range selector (PDL). If PDL has not changed from its previous position, as shown at 92, no action is taken, as shown at 94. If the inquiry at step 92 is false, the algorithm proceeds to check the enable criteria at step 96. The torque truncation for the event is enabled if the flag at 98 is set. It is set if the transmission operating temperature is below a calibrated threshold value, and the vehicle speed is above or equal to a calibrated threshold value, and the throttle position is above a threshold value, and engine speed is above a threshold value, and either a reverse or forward engagement is requested. The vehicle speed is determined by output shaft speed. The transmission operating temperature calibrated threshold is a function of transmission fluid viscosity. The throttle position calibrated threshold is an indication of torque.

For purposes of this strategy, the forward position may mean "overdrive", "drive", "D2" or "D1". The criteria for the driver range selection, which would enable the truncation strategy, requires PDL to be in the forward position and the last position for PDL in a previous control loop must not be equal to forward.

If the criteria at 96 are not satisfied, the routine will end, as shown at 100.

Truncation Value Determination

Figure 4:
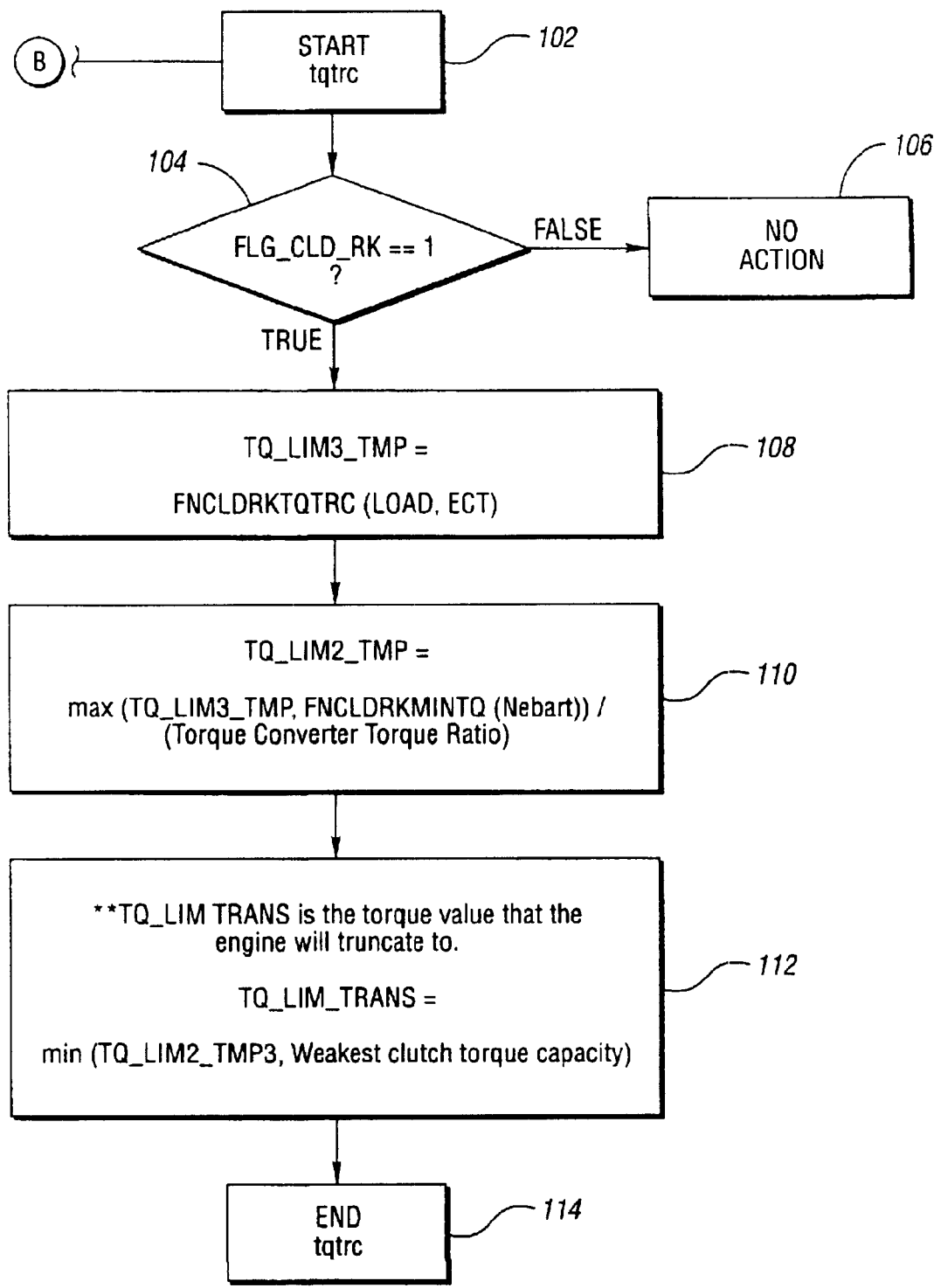
FIG. 4 is a flowchart that summarizes the portion of the strategy that determines how much the engine torque should be truncated if the entry conditions are satisfied.

If the flag at 98 is set, the routine will proceed as shown at 100 and the truncation value determination of FIG. 4 will start, as shown at 102.

The algorithm for truncating high energy engagements is integrated into the strategy that requests engine torque truncation based on maximum transmission friction element torque capacity. The friction element chosen for purposes of this strategy is the friction element with the least capacity.

The integrated algorithm checks to see if a high energy engagement event is enabled or disabled. This is done at step 104. If the flag is not set at 104, no action is taken, as shown at 106. If the flag is set, the routine will proceed to step 108. The routine will retrieve a calibrated maximum torque request value (TQ_LIM3_TMP), which is a function of current operating conditions, i.e., engine load (LOAD) and engine coolant temperature (ECT).

Figure 2:
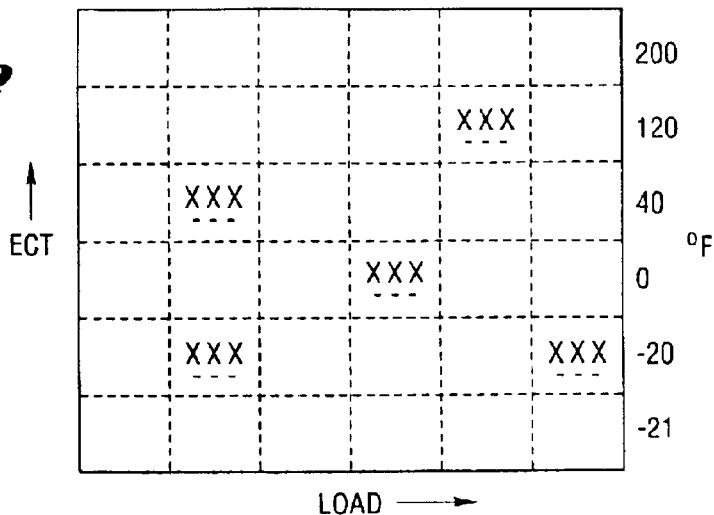
FIG. 2 is a schematic representation of plot of a control variable used by the strategy of the invention to determine whether engine torque truncation is required, the control variable being a function of engine coolant temperature and engine load.

FIG. 2 shows the relationship between coolant temperature, load and torque truncation. This is an empirical relationship expressed in table form. The value for the torque limitation term shown at step 108 is stored in ROM and used by the CPU to determine how much the engine torque should be truncated.

This value is then compared to a calibrated minimum value of engine torque at step 110. This is done to prevent engine instability at the current engine speed. This comparison will minimize the possibility of requesting an engine torque value that may cause engine instability. The maximum of these two values is then compared to the existing clutch capacity torque request value, and the minimum value is taken, as shown at 112. The routine then is complete, as shown at 114.

Summary of Entry Conditions, Torque Control and Duration of Torque Reduction

If all of the entry conditions described with reference to FIGS. 3*a* and 3*b* are satisfied, the high energy engagement strategy is enacted. This reduces the engine torque level to a specified value. The entry conditions are based upon engine speed, throttle position, transmission fluid temperature, vehicle speed and range selector lever position changes from either a forward drive to reverse drive or from reverse drive to forward drive. The entry conditions may be robustly designed to apply to most automatic transmissions and transaxle applications currently used commercially.

The first entry condition requires the strategy to be flagged when the engine speed is greater than the level specified by the engine and transmission calibration. High engine torque, combined with clutch tie-up, is a cause of friction material distress. At high engine speeds, the engine generally produces sufficient torque to cause distress to simultaneously engaged clutches.

The second entry condition states that the throttle must be opened before the strategy is enacted. This will prevent engine torque reduction during movement of the range selector from park or neutral to forward, or from park or neutral to reverse, or from forward to reverse, or from reverse to forward static engagements.

The third entry condition states that the strategy is only activated when the transmission fluid is below a specified temperature. The temperature clip is dependent upon several transmission characteristics, such as the viscosity of the transmission fluid, engagement time, disengagement time and fluid exhaust time of the clutches. It depends also on the friction material energy capacity of the clutches, as well as lubrication flow and heat receptor rate of the clutches.

Generally, clutch tie-up and high energy dynamic engagements occur while rock cycling with cold transmission fluid temperatures. Therefore, the strategy is not enacted while the transmission is at ambient operating temperatures. The strategy can be calibrated, however, to function across the entire range of transmission fluid temperatures if that is required during rock cycling maneuvers and friction material distress occurs.

The fourth entry condition states that the strategy is activated when the vehicle speed, measured using the output shaft speed, is above a specified level. If the vehicle traction wheels are spinning, torque is being transferred and friction material distress may occur. The vehicle speed entry condition is intended to prevent the strategy from unnecessary activation.

The final entry condition states that the range selector lever (PDL) must be cycled from non-forward (reverse, park, neutral) to forward or cycled from non-reverse to reverse before the strategy is activated. This approach will take care of two considerations:

(i) the apply clutch gains torque capacity before the off-going clutch exhausts; and (ii) the strategy provides a means for protecting the oncoming clutch while it is gaining torque capacity.

The magnitude of the requested torque reduction is a function of engine stability, temperature, load and speed. The strategy should not cause engine stalling, instability or misfiring. Ideally, to prevent or minimize clutch distress incurred during cold rock cycling, engine torque should be decreased below an absolute value determined by transmission hardware, transmission fluid viscosity, and converter torque ratio. Depending on engine stability and torque output, this may or may not always be possible for all powertrain applications. The torque controls and hardware technology may be different for various engines. Consequently, the percentage torque reduction is generally lower for engines that may lack the necessary engine torque controls.

Further, it may not be possible for engines with high torque outputs to truncate below the level at which a possibility of clutch distress is completely eliminated. The present strategy accounts for these factors by using an integrated function that, based upon testing, can reduce engine torque to a specified level. Clutch distress incurred during cold rock cycling is a direct function of the level of engine torque. Therefore, the greater the percentage of engine torque reduction, the less is the possibility of distress sustained by the clutches.

The strategy torque request is a function also of engine temperature. The method of torque reduction can vary from one powertrain to another. It generally is achieved, however, through cylinder cutout (fuel control), spark retard or both. Percentage torque reduction is higher at cold engine temperatures. The strategy accounts for this by allowing the operator to specify less torque reduction at cold temperatures.

The torque reduction request of the strategy is also a function of engine load. The user has the ability to increase the torque request as engine load increases. This keeps the percentage of engine torque reduction relatively constant across the range of engine torque output. The maximum percentage torque reduction is a function of engine stability.

To prevent engine instability, a calibration function is included in the strategy to increase the torque request when the engine speed decreases below a specified level. Therefore, if the user inadvertently requests a torque value that causes an unacceptably low engine speed, this function would immediately increase the engine torque.

The strategy is designed to match the duration of the engine torque reduction to the automatic transmission friction element engagement and disengagement time. At cold temperatures, the transmission fluid viscosity increases, thereby creating elongated friction element engagement and disengagement time. This increases the length and the magnitude of any potential friction element tie-up condition caused by cold rock cycling. Ideally, the duration of the engine torque reduction request is calibrated to ensure that the exhausting friction element is fully disengaged before the engine torque is returned to the normal specified value. The operator can test to determine disengagement time as a function transmission fluid viscosity, the area, length of pressure exhaust passages, the return spring rate, and the range selector lever position. This information is hardware dependent, and will vary depending on the powertrain application.

During a forward-to-reverse or a reverse-to-forward power-on dynamic engagement at cold transmission fluid temperatures, the operator may cycle the range selector lever through neutral. When the operator cycles between forward and reverse and between reverse and forward, and if the neutral state is requested for a period of time that is insufficient to allow the off-going clutch to lose capacity, the strategy will reduce the requested torque for a period of time sufficient to allow release of the off-going friction element. However, if the transmission remains in neutral for a time period that is sufficient for the off-going friction element to lose torque capacity, then the strategy times out and the engine torque reduction is discontinued. The strategy can be calibrated to determine friction element disengagement time as a function of transmission fluid temperature.

The strategy will protect the friction elements by establishing a torque limit during high energy cold rock cycling events. This is done by the control module which will issue the lowest maximum engine torque that will protect the most vulnerable transmission friction element. This feature will communicate the lowest torque value to the torque control, which will then query spark and fuel controllers to take appropriate action to lower the engine torque. Further, the strategy will determine the amount of time that the transmission will request torque truncation during a cold rock cycling event.

Although an embodiment of the invention has been described, it will be apparent to persons skilled in the art that modifications may be made without departing from the scope of the invention. All such modifications and equivalents thereof are intended to be within the scope of the following claims.

What is claimed is:

1. A control strategy and method for controlling torque transfer from a throttle-controlled automotive vehicle engine through geared torque flow paths in a transmission to vehicle traction wheels, the engine having an output torque controller for any given throttle position and engine speed including a torque reducer whereby torque is truncated, the transmission having fluid pressure-operated friction clutch and brake elements for establishing and disestablishing forward and reverse torque flow paths, a transmission fluid temperature sensor, an engine coolant temperature sensor, a traction wheel speed sensor, an engine throttle position sensor, a driver-operated range selector for establishing a forward drive torque flow path and a reverse drive torque flow path, the strategy and method comprising the steps of:

determining the duration of a torque truncation when the range selector is repeatedly cycled between positions corresponding to the reverse torque flow path and the forward torque flow path as a function of transmission fluid temperature;

verifying whether entry conditions are met for entry into a torque truncation mode, the entry conditions including a determination of whether the transmission fluid temperature is below a calibrated value;

determining the magnitude of the torque truncation as a function of engine load and engine coolant temperature;

setting the maximum engine torque truncation as determined by a calibration factor that ensures engine stability; and modifying the engine torque during movement of the range selector lever between forward and reverse positions when the entry conditions are met, whereby friction element distress is avoided as one friction element is released and another friction element is applied during repeated cycling of the range selector lever between positions corresponding to forward drive and reverse drive.

2. The control strategy and method set forth in claim 1 wherein the step of verifying entry conditions for entry into a torque truncation mode includes determining whether traction wheel speed is greater than a calibrated threshold value.

3. The control strategy and method set forth in claim 2 wherein the step of verifying entry conditions for entry into a torque truncation mode includes determining whether the engine speed is greater than a calibrated threshold value.

4. The control strategy and method set forth in claim 3 wherein the step of verifying entry conditions for entry into a torque truncation mode includes determining whether the engine throttle position is greater than a calibrated threshold value.

5. The method and strategy set forth in claim 1 wherein the engine is a spark-controlled engine and the torque reducer comprises a spark retard system, the step of modifying engine torque comprising retarding the spark advance so that fuel combustion in the engine commences later in the engine combustion cycle.

6. The method and strategy set forth in claim 1 wherein the engine comprises a fuel control for varying the rate of fuel delivery to the engine, the step of modifying engine torque comprising reducing the rate of fuel delivery to the engine.

7. A control strategy and method for controlling torque transfer from a throttle-controlled automotive vehicle engine through geared torque flow paths in a transmission to vehicle traction wheels, the engine having an output torque controller for any given throttle position and engine speed including a torque reducer whereby torque is truncated during power-on, high energy clutch engagements, the transmission having fluid pressure-operated friction clutch and brake elements for establishing and disestablishing forward and reverse torque flow paths, a transmission fluid temperature sensor, an engine coolant temperature sensor, a traction wheel speed sensor, an engine throttle position sensor, a driver-operated range selector for establishing a forward drive torque flow path and a reverse drive torque flow path, the strategy and method comprising the steps of:

determining the duration of a torque truncation when the range selector is moved to a forward or reverse drive position and the throttle is advanced as a function of transmission fluid temperature;

verifying whether entry conditions are met for entry into a torque truncation mode, the entry conditions including a determination of whether the transmission fluid temperature is below a calibrated value;

determining the magnitude of the torque truncation as a function of engine load and engine coolant temperature;

setting the maximum engine torque truncation as determined by a calibration factor that ensures engine stability; and modifying the engine torque during movement of the range selector into forward or reverse positions when the entry conditions are met, whereby friction element distress is avoided as one friction element is released and another friction element is applied.

8. The control strategy and method set forth in claim 7 wherein the step of verifying entry conditions into a torque truncation mode includes determining whether traction wheel speed is greater than a calibrated threshold value.

9. The control strategy and method set forth in claim 8 wherein the step of verifying entry conditions into a torque truncation mode includes determining whether engine speed is greater than a calibrated threshold value.

10. The control strategy and method set forth in claim 9 wherein the step of verifying entry conditions into a torque truncation mode includes determining whether engine throttle position is greater than a calibrated threshold value.

11. The method and strategy set forth in claim 7 wherein the engine is a spark controlled engine and the torque reducer comprises a spark retard system and the step of modifying engine torque comprising retarding the spark advance so that fuel combustion in the engine commences later in the engine combustion cycle.

12. The method and strategy set forth in claim 7 wherein the engine comprises a fuel control for varying the rate of fuel delivery to the engine and the step of modifying engine torque comprises reducing the rate of fuel delivery to the engine.

* * * * *